US009871594B2

(12) United States Patent
Tatzel et al.

(10) Patent No.: US 9,871,594 B2
(45) Date of Patent: Jan. 16, 2018

(54) MECHANICAL TRANSLATION OF A VARIABLE RADIATION TRANSMISSION DEVICE

(71) Applicant: SMARTERSHADE, INC., Chicago, IL (US)

(72) Inventors: Ryan Tatzel, Syosset, NY (US); William McLeod, New york, NY (US); William Glaser, San Francisco, CA (US)

(73) Assignee: VG SMARTGLASS, LLC, Jupiter, FL (US)

( * ) Notice: Subject to any disclaimer, the term of this patent is extended or adjusted under 35 U.S.C. 154(b) by 468 days.

(21) Appl. No.: 14/396,253

(22) PCT Filed: Jan. 22, 2013

(86) PCT No.: PCT/US2013/022453
§ 371 (c)(1),
(2) Date: Oct. 22, 2014

(87) PCT Pub. No.: WO2013/112426
PCT Pub. Date: Aug. 1, 2013

(65) Prior Publication Data
US 2015/0071655 A1    Mar. 12, 2015

Related U.S. Application Data

(60) Provisional application No. 61/589,545, filed on Jan. 22, 2013, provisional application No. 61/639,433, (Continued)

(51) Int. Cl.
*G02B 5/30* (2006.01)
*H04B 10/532* (2013.01)
(Continued)

(52) U.S. Cl.
CPC ............ *H04B 10/532* (2013.01); *E06B 9/24* (2013.01); *H04B 10/501* (2013.01);
(Continued)

(58) Field of Classification Search
CPC   H04B 10/532; H04B 10/505; H04B 10/5051; H04B 10/501; H04J 14/06;
(Continued)

(56) References Cited

U.S. PATENT DOCUMENTS 2,260,220 A   10/1941   Grabau
2,280,358 A   4/1942    Tietig
(Continued)

FOREIGN PATENT DOCUMENTS

EP    0 182 639 A2    11/1985

OTHER PUBLICATIONS

International Search Report from Korean Intellectual Property Office for PCT/US2013/022453, dated Jun. 21, 2013.
(Continued)

*Primary Examiner* — Ted Wang
(74) *Attorney, Agent, or Firm* — The Marbury Law Group PLLC

(57) ABSTRACT

Various embodiments include a variable transmission device including a first smart window panel, a second smart window panel, and a mechanical device configured to linearly translate at least a portion of the first panel relative to the second panel. Further embodiments include a method of varying radiation transmission including the steps of providing a variable transmission device, comprising a first smart window panel, a second smart window panel, and a mechanical device and actuating the mechanical device to linearly translate at least a portion of the first panel relative to the second panel.

15 Claims, 17 Drawing Sheets

Related U.S. Application Data filed on Apr. 27, 2012, provisional application No. 61/639,473, filed on Apr. 27, 2012.

(51) Int. Cl.
  *E06B 9/24* (2006.01)
  *H04B 10/50* (2013.01)
  *F24J 2/40* (2006.01)

(52) U.S. Cl.
  CPC ....... *E06B 2009/2405* (2013.01); *F24J 2/407* (2013.01); *G02B 5/30* (2013.01)

(58) Field of Classification Search
  CPC ...... G02F 2/00; E06B 9/24; E06B 2009/2405; G02B 5/30; F24J 2/407
  See application file for complete search history.

(56) References Cited

U.S. PATENT DOCUMENTS

| | | | |
|---|---|---|---|
| 3,159,844 A | 12/1964 | Haboush | |
| 3,443,855 A | 5/1969 | Land | |
| 3,504,962 A | 4/1970 | Shanley | |
| 3,521,300 A | 7/1970 | Weiss | |
| 3,540,793 A | 11/1970 | Araugo et al. | |
| 3,663,089 A | 5/1972 | Makas | |
| 3,880,496 A | 4/1975 | Davidyan et al. | |
| 4,070,096 A | 1/1978 | Jasgur | |
| 4,153,952 A | 5/1979 | Dussich | |
| 4,285,577 A | 8/1981 | Schuler | |
| 4,364,375 A | 12/1982 | Younghouse | |
| 4,509,825 A | 4/1985 | Otto et al. | |
| 4,512,638 A | 4/1985 | Sriram et al. | |
| 4,579,426 A | 4/1986 | Onufry | |
| 4,719,720 A | 1/1988 | Olsen | |
| 4,773,733 A | 9/1988 | Murphy, Jr. et al. | |
| 4,902,112 A | 2/1990 | Loweve | |
| 4,962,780 A | 10/1990 | Engdahl et al. | |
| 5,033,829 A | 7/1991 | Faroughy | |
| 5,686,979 A | 11/1997 | Weber et al. | |
| 5,841,581 A | 11/1998 | Tutt | |
| 5,940,216 A | 8/1999 | Gibbs | |
| 5,999,316 A | 12/1999 | Allen | |
| 6,046,849 A | 4/2000 | Moseley et al. | |
| 6,185,039 B1 | 2/2001 | Allen et al. | |
| 6,414,790 B1* | 7/2002 | Bennett | G02B 27/281 359/486.02 |
| 6,878,425 B1 | 4/2005 | Gomes | |
| 8,310,757 B2 | 11/2012 | McLeod et al. | |
| 8,508,681 B2 | 8/2013 | Tatzel et al. | |
| 2002/0118328 A1* | 8/2002 | Faris | B82Y 15/00 349/114 |
| 2003/0041537 A1* | 3/2003 | Glover | E06B 1/00 52/204.5 |
| 2006/0046849 A1 | 3/2006 | Kovacs | |
| 2006/0238867 A1 | 10/2006 | Takeda et al. | |
| 2007/0125000 A1* | 6/2007 | Fenelon | E05F 11/385 49/349 |
| 2010/0053751 A1 | 3/2010 | McLeod et al. | |
| 2012/0169950 A1* | 7/2012 | Tatzel | G02B 5/3083 349/18 |

OTHER PUBLICATIONS

International Search Report & Written Opinion issued in PCT Application No. PCT/US2011/067754, dated Jul. 2, 2012.

\* cited by examiner

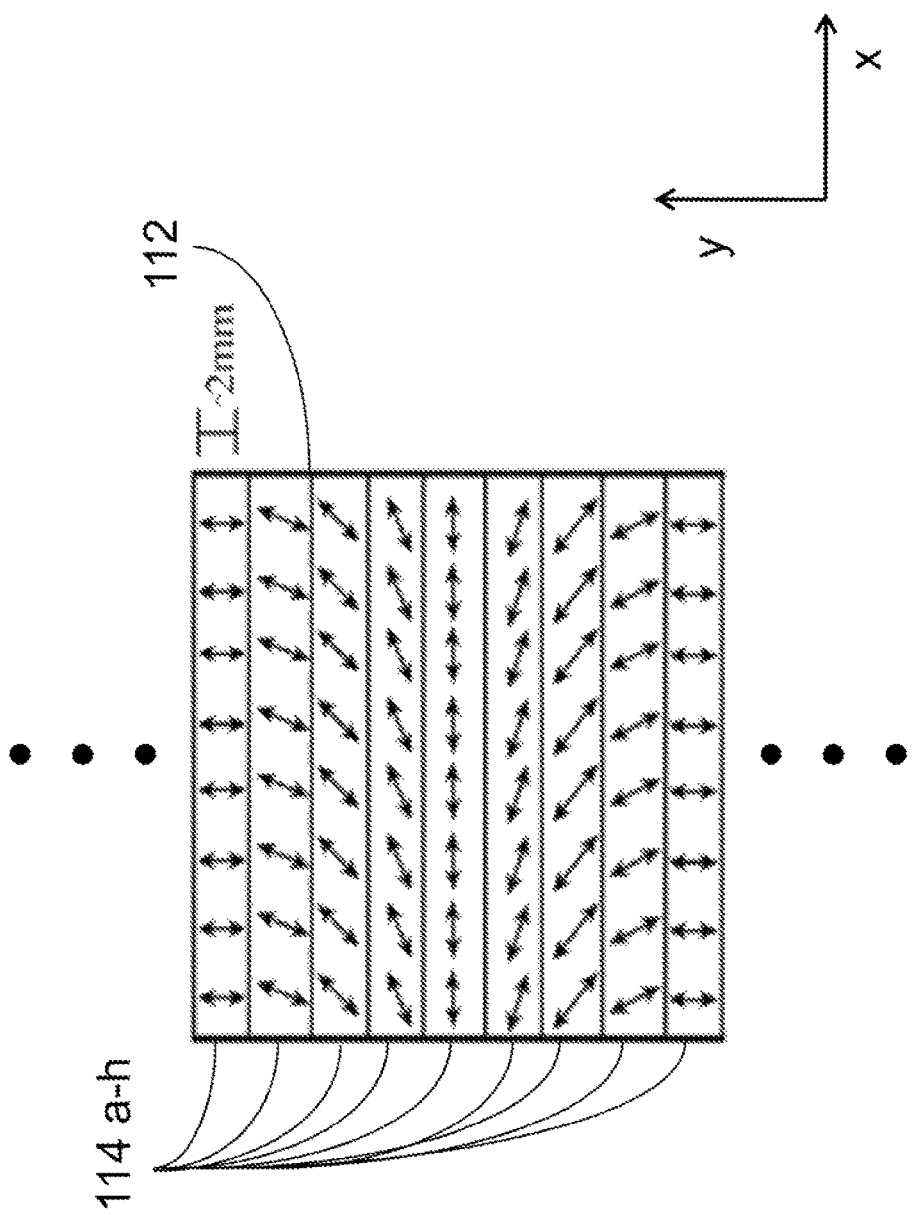

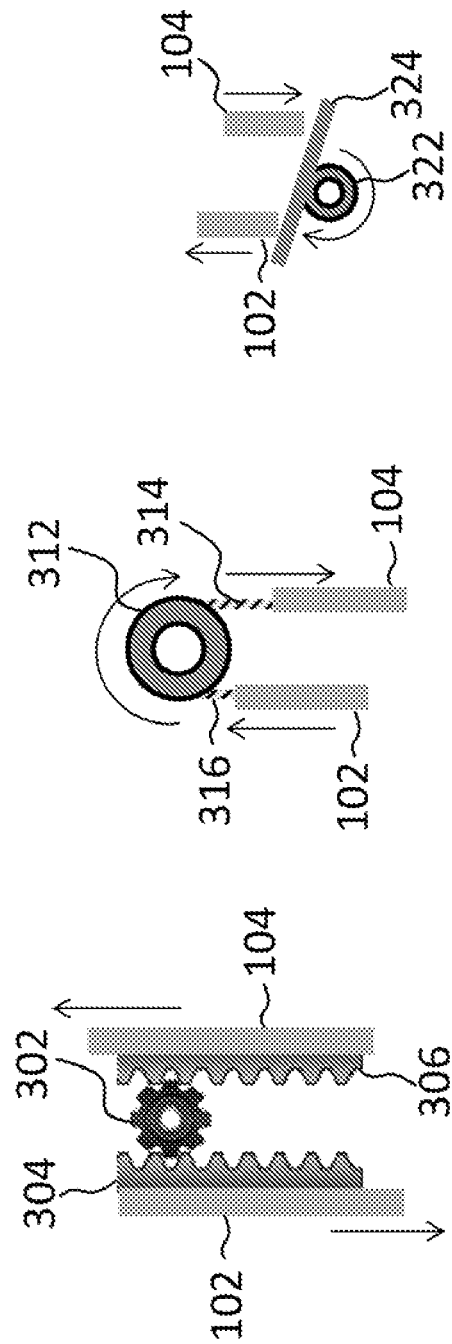

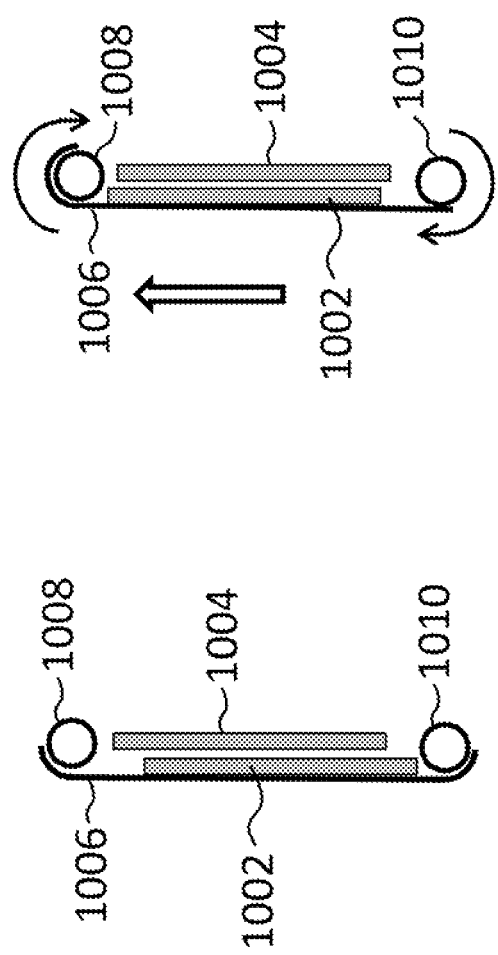

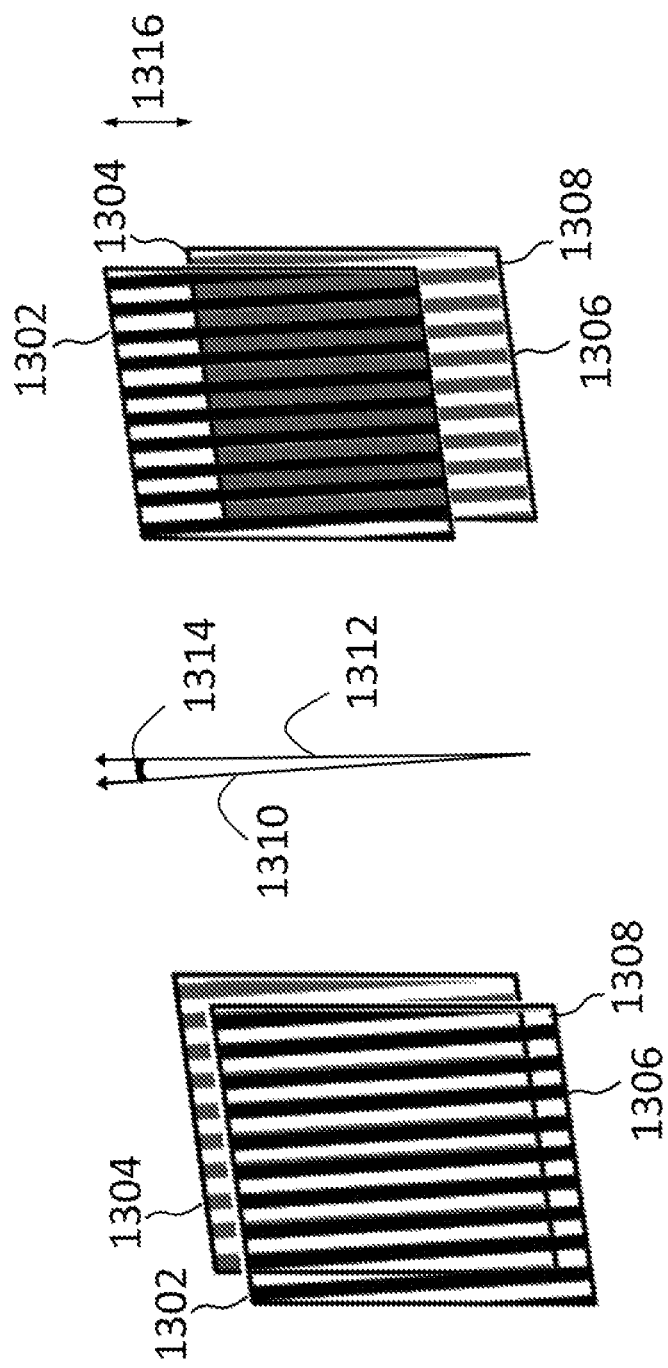

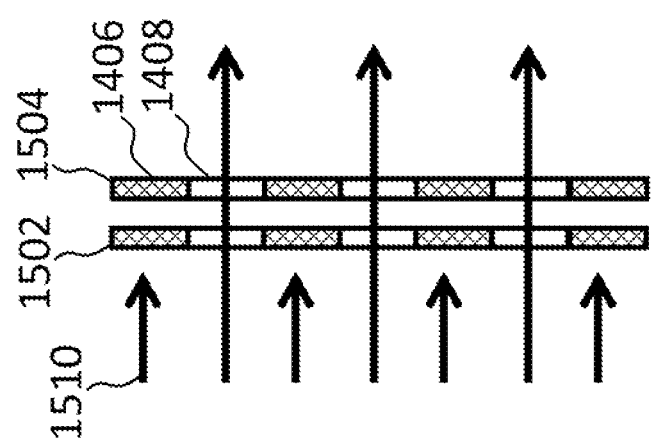
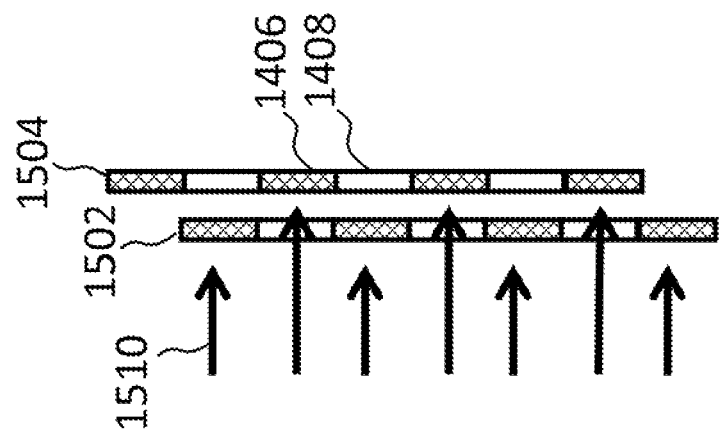

MECHANICAL TRANSLATION OF A VARIABLE RADIATION TRANSMISSION DEVICE

CROSS-REFERENCE TO RELATED APPLICATIONS

This application claim the benefit of priority to U.S. Provisional Patent Application Ser. No. 61/639,473 titled "Methods of Mechanical Translation for Variable Radiation Transmission Device" filed Apr. 27, 2012, U.S. Provisional Patent Application Ser. No. 61/639,433 titled "Variable Radiation Transmission Device with Radiation Blocking Domains" filed Apr. 27, 2012, and U.S. Provisional Patent Application Ser. No. 61/589,545 titled "Variable Heat Transmission Window" filed Jan. 23, 2012, each of which is hereby incorporated herein by reference in its entirety.

BACKGROUND

A polarizer is a device that transforms unpolarized or mixed polarization electromagnetic waves into polarized waves. Polarizers have found a wide array of practical applications such as in photographic filters, microscopes, optoelectronics, lasers, and liquid crystal displays. Wave plates or retarders are optical devices that can change the polarization of electromagnetic waves. Wave plates are often used to control the polarization of waves and therefore are involved in many of the same applications as polarizers. Many prior art devices rotate polarizers or wave plates relative to one another to vary the angle between polarization or optic axes. For example, polarization filters for photography may involve rotating a polarizer to vary the intensity of light transmission through the filter.

SUMMARY

Various embodiments include a variable transmission device including a first uniform polarizer with a first polarization axis, a second uniform polarizer with a second polarization axis, a first patterned wave retarder positioned between the first and second polarizers, a second patterned wave retarder positioned between the first and second polarizers, and a mechanical device configured to linearly translate the first wave retarder relative to the second wave retarder.

Further embodiments include a variable radiation transmission device including a first sheet comprising a plurality of alternating domains varying in transmission of radiation, a second sheet comprising a plurality of alternating domains varying in transmission of radiation, wherein the first or second sheet is configured to be linearly translatable relative to the other one of the first or second sheet, and wherein the first and second sheet both comprise at least one first domain that is opaque or partially opaque and at least one second domain that is less opaque than the first domain.

Further embodiments include a variable heat transmission device including a first sheet comprising a plurality of domains varying in transmission of infrared radiation, a second sheet comprising a plurality of domains varying in transmission of infrared radiation, wherein the first or second patterned sheet is configured to be linearly translatable relative to the other one of the first or second sheet, and wherein the first and second sheets are transmissive for visible light.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 1D is a diagram of a patterned wave retarder divided into several domains of varying optic axis.

FIGS. 3A, 3B, and 3C are diagrams of devices configured to move both smart glass panels simultaneously to reduce the throw distance.

FIGS. 10A and 10B are diagrams of embodiment devices with rollers.

FIGS. 13A and 13B are diagrams of smart glass panels with opaque stripes aligned at a cant angle.

FIGS. 15A and 15B are diagrams showing the varying transmission of infrared radiation through two smart glass panels as one of the panels is translated relative to the other.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "plurality" is used herein to mean two or more. For example, a plurality may refer to three or more or various ranges, such as 2-200, 4-200, or 70-180.

The word "radiation" as used herein may refer to any form of electromagnetic radiation. Various embodiments may be configured to variably control the transmission of particular spectrums of radiation, such as visible light, infrared, ultraviolet, etc.

Various embodiments include "smart" windows or variable radiation transmission devices that may be mechanically actuated to control radiation transmission. For example, embodiments may include 2 panels of smart glass held parallel to one another. When one panel is translated a given distance with respect to the other, a filtering effect is produced until a theoretical minimum of 0% radiation transmission is realized.

Figure 1C:
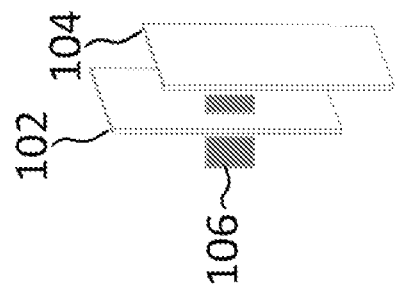
FIGS. 1A, 1B, and 1C are diagrams showing the varying transmission of radiation through two smart glass panels as one of the panels is translated relative to the other.
Figure 1B:
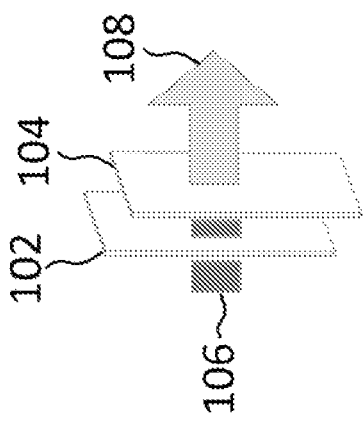
Figure 1A:
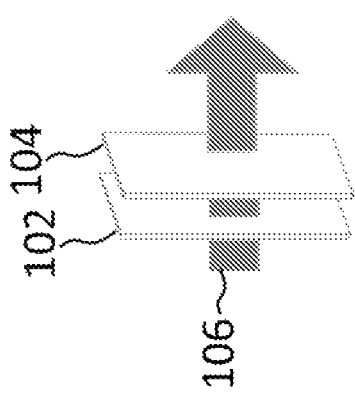

FIGS. 1A-1C illustrates varying transmission of radiation based on how much the smart glass panels are translated. In FIG. 1A, a first panel 102 and a second panel 104 are aligned such that radiation 106 traverses both panels 102 and 104. In various embodiments, the radiation may fully or only partially traverse the first panel 102. For example, if the first panel 102 includes a polarizer, as more fully explained below, certain components of the radiation (i.e., components not aligned with the polarizer) may be blocked (e.g., reflected or absorbed).

In FIG. 1B, the second panel 104 is translated (e.g., shifted down) relative to the first panel 102 (i.e., the first panel 102 and second panel 104 each remain in separate parallel planes and the second panel 104 moves along an axis in its respective plane). The radiation 106 may traverse the first panel 102 but may only partially traverse the second panel 104. Partial transmission is shown as a differently shaded portion 108 in FIG. 1B. In FIG. 1C, the second panel 104 is further translated down into a position such that the radiation 106 may traverse the first panel 102 but not the second panel 104.

In various embodiments, transmission of radiation may vary continuously as the second panel 104 is translated relative to the first panel 102 between the transmitting position (e.g., as shown in FIG. 1A) and the blocking position (as shown in FIG. 1C) and vice versa. In further embodiments, the second panel 104 may be translated beyond the transmitting or blocking positions. For example, radiation transmission may continuously cycle between transmitting and blocking as the second panel 104 is further translated.

In various embodiments, each of the smart glass panels may comprise one or more layers and each layer may comprise a plurality of domains. Each layer or domain may act as a radiation filter, such as a polarizer or wave retarder. These layers and domains may vary across a panel, such as in patterns of continuously or near continuously varying polarization axis or optical axis of polarizer or wave retarder domains, respectively.

In order to continuously vary the amount of radiation transmitted, various embodiments may rely on two patterned wave retarders placed in between two uniform linear polarizers to control the variation of radiation transmission. A uniform linear polarizer may have the same linear polarization axis throughout (i.e., a single domain). A patterned wave retarder may have several domains that reorient radiation by varying amounts. The translation of one patterned retarder with respect to the other may change the polarization state of the radiation and control how much radiation will pass through the second polarizer.

Various different types of wave retarders may be used in embodiments. Wave retarders may be patterned to include several domains with different characteristics. When a wave retarder is placed between two crossed uniform linear polarizers the amount of radiation transmitted is determined by both (1) the angle between the polarization axis of the first polarizer and the optic axis of the wave retarder and (2) the retardance. Moreover, the retardance is determined by the thickness of the birefringent material and the birefringence of the material (the difference between the refraction indices of extraordinary and ordinary rays, $n_e - n_o$). As a result, a patterned retarder can be constructed by modulating any one or more of these three parameters.

In several embodiments, the wave retarder may be patterned by varying the orientation of the optic axis in different domains of the wave retarder. For retarders that will result in a specified number of discrete transmission levels, the two patterned retarders may comprise a specified number of retarding areas or domains. These retarding areas may be of equal width on each retarder. The orientation of the optic axis of the wave retarder may differ from the orientation of the optic axis of an adjacent area by a standard angular difference (e.g., 0.1 to 30 degrees, such as 2-10 degrees). Alternately, the wave retarders may be configured to provide a smooth, continuous change in radiation transmission when linearly translating one retarder or panel with a retarder relative to a second retarder or panel. One panel may move while the other is stationary or both panels may move during the translation. In alternate embodiments, the wave retarders may be patterned to vary thickness or birefringence continuously or across a plurality of domains.

FIG. 1D illustrates a patterned wave retarder that may be used in various embodiments. The patterned wave retarder 112 may be divided into several domains 114 with different optical axes. The axes of the domains 114 in FIG. 1D are indicated by arrows. The optical axis may be uniform within each domain but vary between adjacent domains. These optical axes may be selected to gradually shift across adjacent domains 114 as shown in FIG. 1D. These domains 114 may continue and repeat as much as needed as indicated by the dots above and below the patterned wave retarder 112. The patterned wave retarder 112 may vary in size. Each domain 114 may be strip shaped and may be 1-10 mm, such as around 2 mm wide in some embodiments, but this width may vary.

Figure 2:
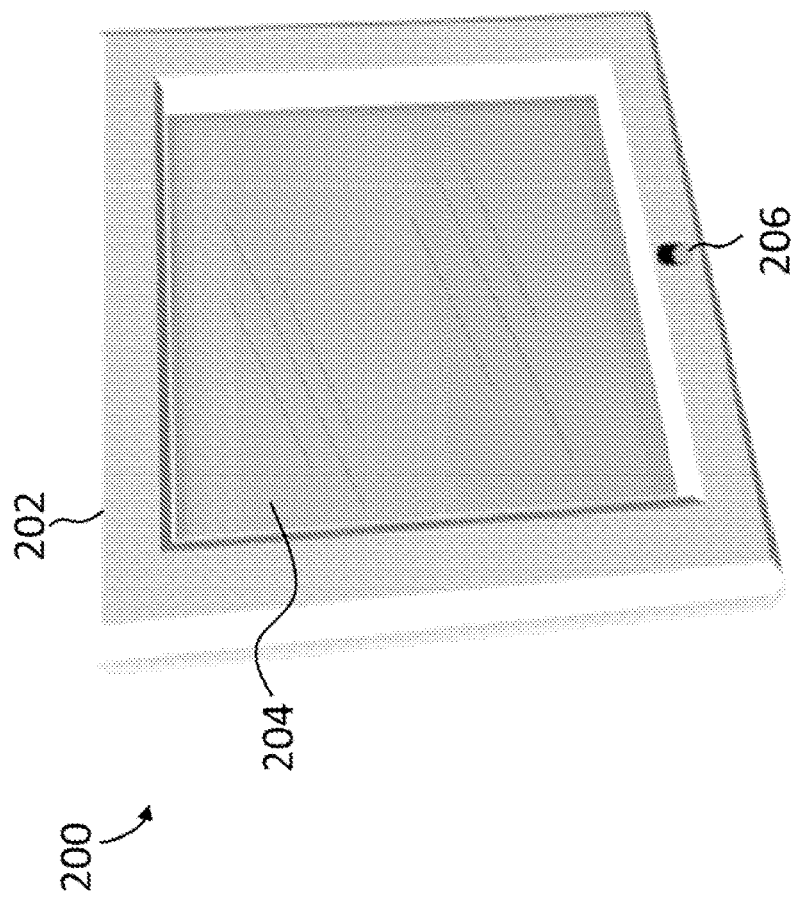
FIG. 2 is an illustration of a smart glass window.

The amount of radiation transmitted through a device may vary as the panels are translated relative to one another and the various domains are aligned. FIG. 2 illustrates an embodiment window device 200 with smart glass panels 204. A frame 202 may be used to hold these panels parallel and a gap may be left for the translation distance required for filtering. A handle or knob 206 may also be provided to make the manual translation of one panel with respect to the other easier.

Section 1: Translation Schemes

In various embodiments, windows may be activated by mechanically translating in any direction, such as either horizontally or vertically. The orientation of the window with respect to gravity may also be important. In various embodiments, windows may be oriented normal, parallel, or any angle in between with respect to the earth's surface. In further embodiments, it is also possible to orient the window and translate it at an arbitrary angle, as may be seen in a skylight. Each orientation has different characteristics. For instance, a vertically translated window may require a stronger operator to counter the effects of gravity.

A mechanically switchable window may be operated simply by translating one panel with respect to the other. Alternatively, it may also be operated by moving both panels in opposing directions. This cuts the required throw distance (i.e., the distance a panel must translate) for each panel in half. This has the advantage of requiring a smaller take-up space of un-filtered window as well as requiring less time to transition. Further, in various embodiments this device can make use of counterweighting of the 2 panels to create a window in which zero work is done. This drastically reduces the force and energy required for operation.

One way to achieve this counterweighted motion is to use a rack and pinion to oppose the 2 panels. FIG. 3A illustrates an example embodiment with a pinion 302 between a first panel 102 and a second panel 104. The pinion 302 may have teeth that mesh with a first rack 304 on the first panel 102. Teeth on the other side of the pinion 302 may mesh with a second rack 306 on the second panel 104. When the pinion 302 is turned it may move the panels 102, 104 in opposite directions.

A second embodiment may make use of a pulley system in which the two panels are on opposite ends of the pulley. FIG. 3B illustrates an example embodiment with a pulley 312 connected to a first panel 102 with a first cable 316 and to second panel 104 with a second cable 314. Rotation of the pulley 312 (indicated by the arrow) may raise one panel while lowering the other. In various embodiments, the first and second cables 316, 314 may be connected or a single cable.

A third embodiment may make use of a double lever, much like a see-saw. FIG. 3C illustrates an embodiment with a fulcrum 322 with a lever 324 that contacts a first panel 102 and second panel 104. As the lever 324 is rotated about the fulcrum 322 (indicated by the arrow), one end of the lever 324 is lifted to raise the first panel 102 and the other end falls to lower the second panel 104.

There are several ways to construct the panels of patterned retarder and polarizer that comprise the smart glass. These different constructions each have their own mechanical stiffness, thermal stability, abrasion resistance, weight, birefringence, and cost considerations.

Figures 4A, 4B, 4C, 4D, 4E, 4F:
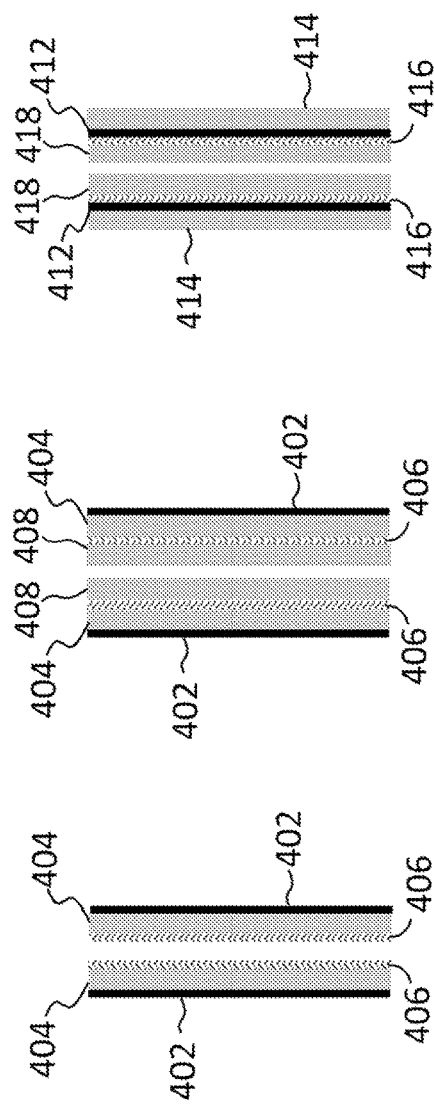
FIGS. 4A-4F are cross sectional diagrams of embodiment smart glass panels.

FIG. 4A illustrates one embodiment in which each panel includes a polarizer layer 402 and patterned wave retarder layer 406 on opposite sides of a glass substrate 404. The panels may be arranged such that the waver retarder layers 406 are in between the polarizer layers 402.

FIG. 4B illustrates an alternate embodiment in which the patterned retarder 406 is in between (e.g., sandwiched) the first glass substrate 404 and a second glass substrate 408. FIG. 4C illustrates another alternate embodiment in which a polarizer layer 412 and wave retarder layer 416 are in between a first glass substrate 414 and a second glass substrate 418. The wave retarder layers 416 may still be in between the polarizer layers 412.

FIGS. 4D-4F illustrate similar embodiments to those of FIGS. 4A-4C except that they include a polymer substrate (e.g. a clear polymer or another polymer that allows the desired radiation to pass through it). FIG. 4D illustrates panels with a polarizer layer 402 and patterned wave retarder layer 406 on opposite sides of a polymer substrate 424. FIG. 4E illustrates an alternate embodiment in which the patterned retarder 406 is in between the first polymer substrate 424 and a second polymer substrate 428. FIG. 4F illustrates an alternate embodiment in which a polarizer layer 432 and wave retarder layer 436 are in between a first polymer substrate 434 and a second polymer substrate 438.

Alternate embodiments may include panels a combination of glass and polymer substrates. Alternate embodiments may include panels with no substrates, such as if the wave retarders was deposited directly on the polarizer.

Further embodiment panels and devices are disclosed in U.S. patent application Ser. No. 12/199,914 and U.S. patent application Ser. No. 13/339,764, both of which are incorporated herein by reference in the entirety.

Section 2: Manual Translation Devices

One embodiment may require only that a handle or knob 206 be connected to the mechanism (e.g., rack and pinion, pulley, lever, etc.) used for translating the panel(s) of smart glass. However, other translation device described below may be used.

Cam-Slider

In various embodiments, a cam-slider or cam-roller assembly may be used to convert rotation into linear translation so that a dimmer knob style control can be used. The cam may be placed in the center of the window for balance or it may be placed off center and linked to one or more parallel cams in order to move the control system to a less visually obtrusive location. Further, a spring may be provided to aid in the return motion of the translating pane. This is helpful in horizontal and arbitrary orientation motion schemes.

Figure 5B:
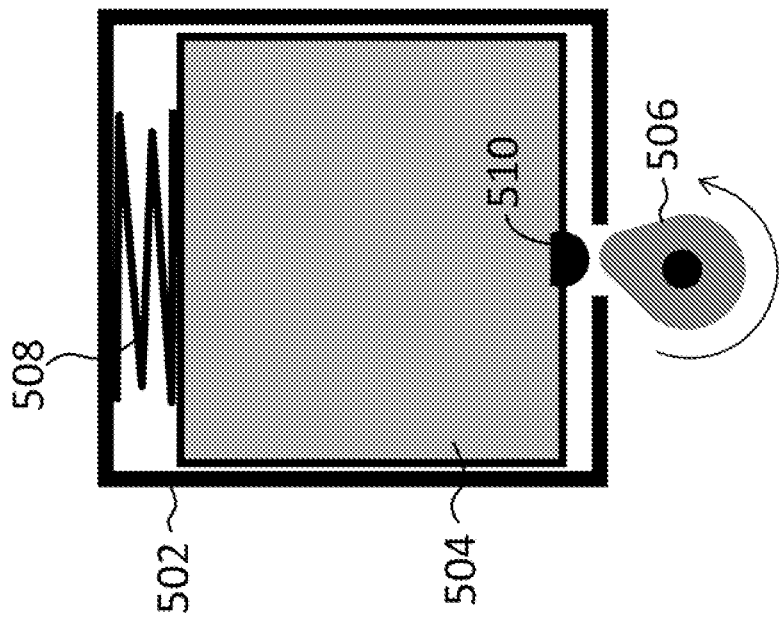
FIGS. 5A and 5B are diagrams of embodiment devices with a cam.
Figure 5A:
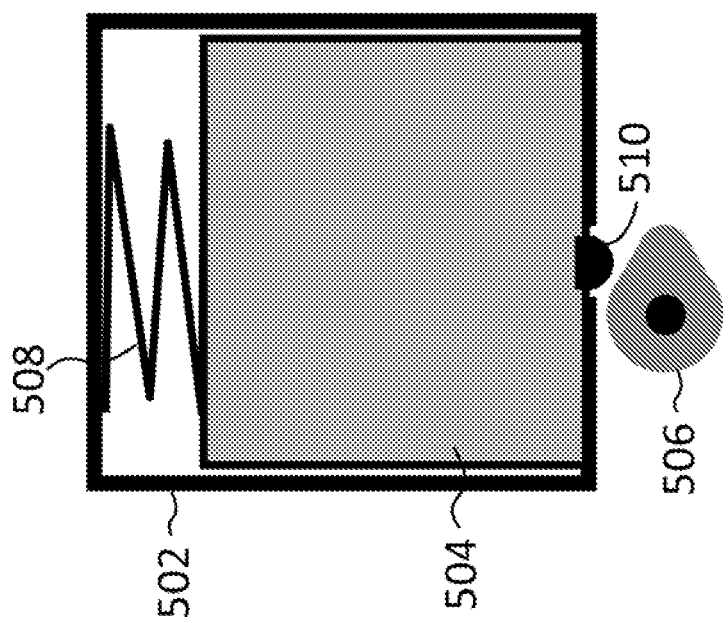

FIGS. 5A and 5B illustrate an example embodiment device with a rotating cam 506. A smart glass panel 504 may be secured in a frame 502 with a spring 508 between the top of the panel 504 and the top of the frame 502 to return the panel 504 to an initial position (e.g., the position shown in FIG. 5A). The cam 506 may be rotated (indicated by the arrow) such that the cam pushes a bumper 510 or other point of contact on the panel 504 to translate the panel 504 away from the cam 506 (e.g., the position shown in FIG. 5B) to raise the panel and compress the spring.

In further embodiments, the cam profile can be customized to be advantageous. The human eye perceives light in a logarithmic fashion. Roughly:

$$I_p = \text{Log}_{10}(I)/5$$

where I is the actual intensity and $I_p$ is the perceived intensity. Further, Malus's law gives the intensity (I) produced when a polarizer is placed in front of a polarized incident beam.

$$I = I_o \cos^2 \theta_i$$

The cam may be profiled to linearize this perception making each degree of the rotation seem to correspond to the desired light intensity. Finally, this profile can also be cut to any arbitrary curve to give a desired relationship between degrees of rotation and light intensity. One of the considerations is backdriving. With a spring force or force due to gravity pushing on the cam, a ratchet system may be employed to allow panel movement in discrete steps having a predetermined length.

Figure 5C:
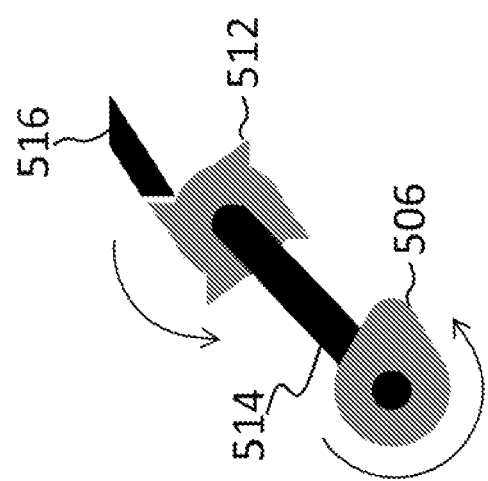
FIG. 5C is a diagram of a ratcheting device coupled with a cam.

FIG. 5C illustrates an embodiment with a ratcheting device. The cam 506 may be axially coupled with a ratchet gear 512 by an axle 514. A pawl 516 may allow the gear 512 to rotate in one direction (as shown by the arrow in FIG. 5C) but prevent rotation in the opposite direction by catching on the teeth of the gear 512. In alternate embodiments, rotational movement may be transferred from the gear 512 to the cam 506 in various other manners, such as via gears or belts.

Rack and Pinion

A direct rack and pinion may be used to convert rotating input into a linear translation. A rotated knob or lever may be used to rotate a pinion. This pinion would then drive a rack that is affixed to one of the translating panels. This system could also have a rack attached to each of the panes so as to move both of them in opposing directions as described above with regard to FIG. 3A.

Tilt-Rod

Various embodiments may use a tilt-rod system. In a contemporary blind tilt-rod system, a wand is turned, rotating a horizontal tilt-rod hidden inside the head rail. This rotating bar rotates a plurality of horizontally distributed tape drums. These rotate and reel/unreel a tape or string that pulls on one side of the blind assembly, tilting the blinds into the open or closed positions. Various embodiments may contain a similar system. The head rail may be produced to fit into existing head rail dimensions. Instead of actuating a blind system, the system translates one or both of the smart-glass panels. This could utilize a string or tape as is used in current systems, or be combined with a rack and pinion or any other linkage described above to drive the panels.

Figure 6:
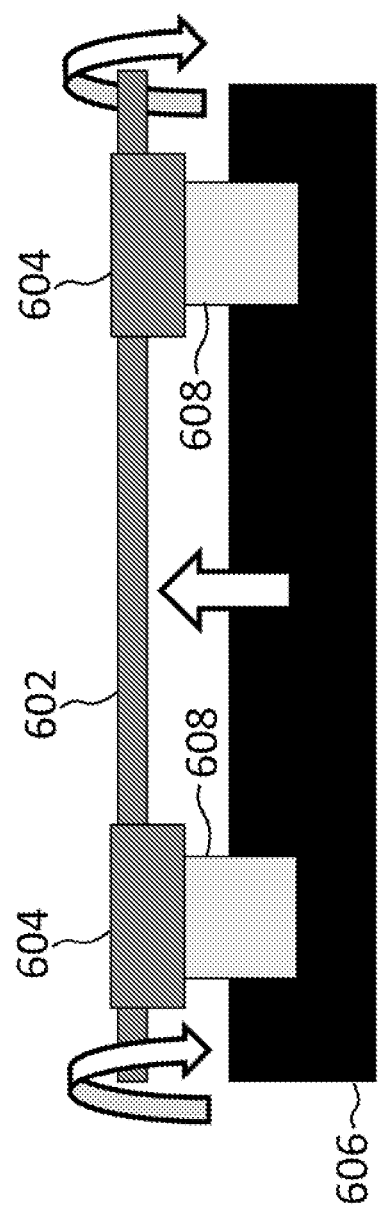
FIG. 6 is a diagram of an embodiment device with a tilt rod.

FIG. 6 illustrates an example embodiment in which a panel 606 may be translated by a tilt rod 602. The tilt rod 602 may include one or more cylinders 604 each coupled with a connector 608 which may wrap around the cylinders 604 as the tilt rod 602 is rotated (as indicated by the arrows in FIG. 6). The connectors 608 may be joined with the panel 606 and as the connectors 608 (e.g., tape, string, cable, etc.) are wrapped around the cylinders 604, the panel 606 may be raised. Alternately, the panel 606 may be lower by rotating the tilt rod 602 in the opposite direction.

Worm Gear

Another system for converting rotational input into linear translation is through a worm gear or power screw assembly. In this embodiment a rotating input is linked to a worm gear. The gear would then drive a linear slide or carriage (e.g., a smart glass panel) that translates axially along the worm gear. This allows fine positional accuracy and a small geometry. A variation on this is a scissor jack assembly that will allow horizontal screws to create vertical motion. This allows the take up space to be used to contain the assembly.

Scotch Yoke

Another rotational to linear system is the scotch yoke. This system converts rotation into an arbitrarily oriented linear translation with a sinusoidal relationship. This allows for both finer control at final positions and for a profile that counters the sinusoidal intensity given by Malus's law.

Wedge

A wedge or wedge-roller assembly can be used to convert horizontal translation to vertical or vice versa. This may allow a system to fit neatly into the take-up space instead of being oriented orthogonally. A return spring or gravity can be used to provide the return force.

Figure 7B:
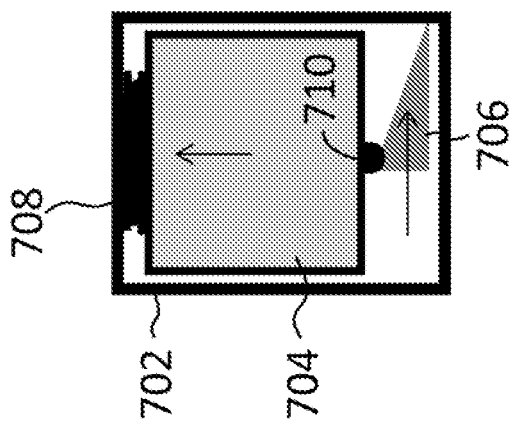
FIGS. 7A and 7B are diagrams of embodiment devices with a wedge.
Figure 7A:
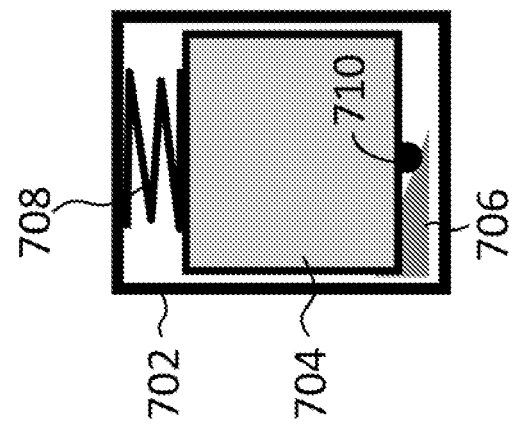

FIG. 7A illustrates an embodiment device with a wedge 706 for translating one or more panels 704. The smart glass panel 704 may be secured in a frame 702 with a spring 708 between the top of the panel and the top of the frame to return the panel 704 to an initial position. The wedge 706 may be in contact with a bumper 710 or other point of contact on the panel 704 such as a roller. In various embodiments, the wedge 706 may be in a different plane than the panel 704, and the bumper 710 may intersect both planes to contact both the panel 704 and the wedge 706.

FIG. 7B illustrates the device after the wedge 706 is slid (e.g., in the direction perpendicular to the direction of panel movement). The panel 704 may be pushed upward by the wedge 706 and the spring 708 may compress as the bumper 710 contacts a greater height on the wedge 706. The wedge 706 may be translated directly via a knob or electromechanically, such as by a linear actuator. This allows a larger translation to produce a smaller, more finely controlled movement of the panel.

Over-Center Linkage

An over-center linkage may be incorporated in various embodiments to create a bi-stable window position. This is especially useful in variable radiation transmission windows where there are only 2 desired states. This spring loaded, bi-stable linkage will hold its position until it is displaced by a small but forceful amount. Then it will snap to the next position and hold it. For example, in one embodiment, this will snap between transparent and opaque states. This minimizes the amount of time spent in transitional states. One can also use a self-locking over-center linkage to create a rest position such that continued mechanical force is not required to hold a counter active force. It is also possible to create multi-position over-center linkages.

Figure 8A:
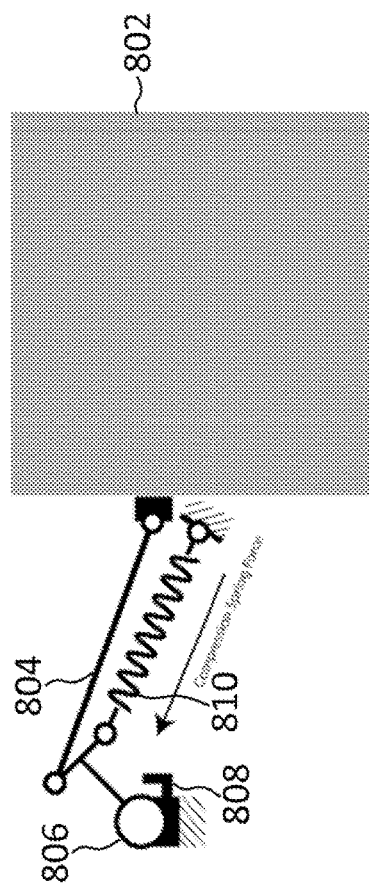
FIGS. 8A and 8B are diagrams of embodiment devices with an over center linkage.
Figure 8B:
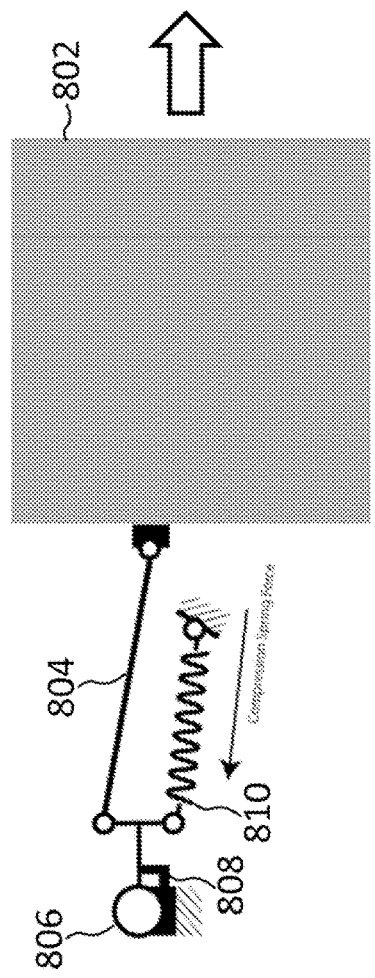

FIG. 8A and FIG. 8B illustrate the two stable positions of an embodiment device. A panel 802 may be connected to a rod 804. The rod 804 may be connected to a rotating pin 806 and a spring 810. In FIG. 8A, the pin 806 may be rotated such that the rod 804 draws the panel 802 and is balanced by the force of the spring 810. In FIG. 8B, the pin may be rotated to a stop 808. Rotating the pin 806 may push the rod 804 and translate the panel 802.

Magnetic Slider

Existing in-between-the-glass blinds use a system that contains a magnetic slider mechanism. The magnetic slider is used to transmit motion from outside the glass to a sealed blind mechanism inside the glass. An embodiment of the mechanical variable transmission window may be to have the smart glass panes in between the glass of a sealed insulated glass unit (IGU). In this case, the magnetic slider mechanism may be similar to existing between-the-glass blinds. This magnetic coupling could also be a rotational coupling in contrast to the linear slide couplings that are mostly employed today. Further, this magnetic coupling allows for simple interchangeable sliders. Several different styles of sliders may be used, or a manual slider may be exchanged for an automated, electronic one. This can be achieved without opening the sealed IGU. A mechanically switchable permanent magnet can also be employed to allow for convenient device removal and placement.

Mechanically Switchable Magnet

Various embodiments may include one or more mechanically switched permanent magnets. These types of switchable magnets can be used to create a window that can vary between 2 or more states of displacement.

Figure 9B:
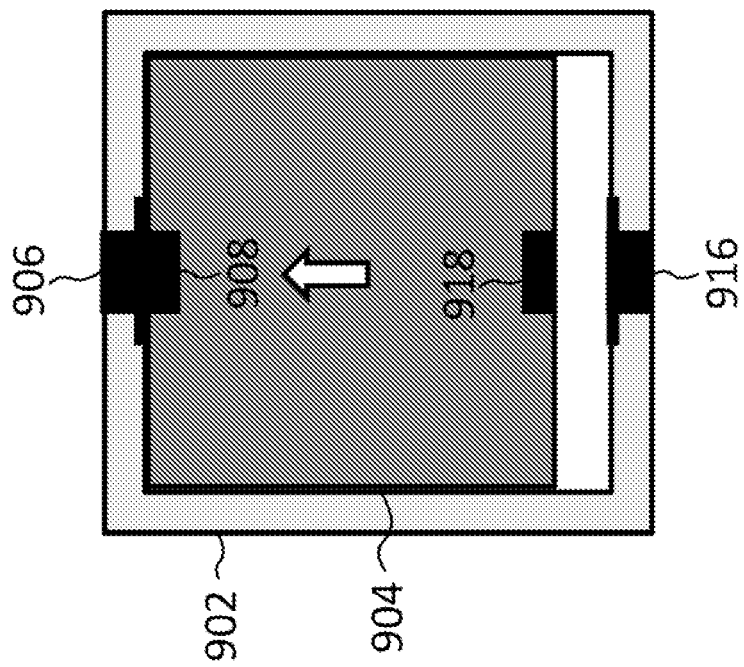
FIGS. 9A and 9B are diagrams of embodiment devices with mechanically switched magnets.
Figure 9A:
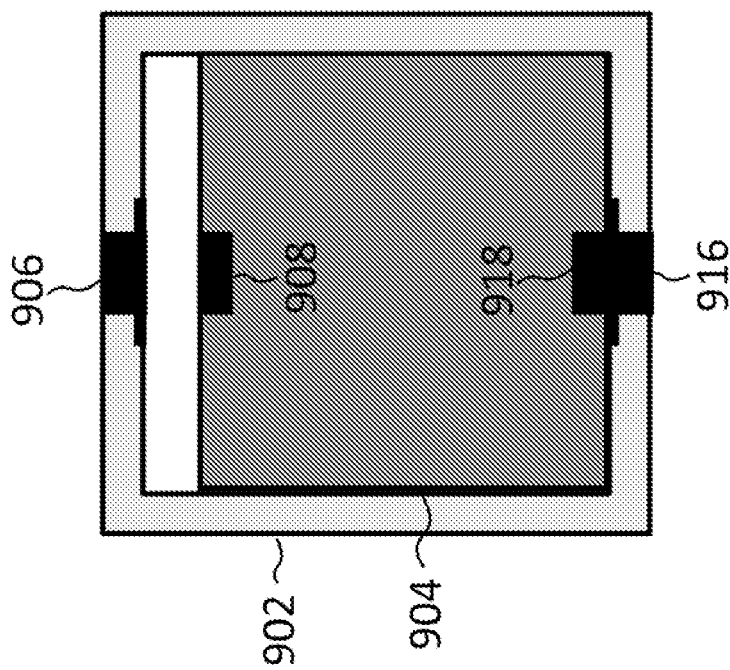

FIG. 9A illustrates an embodiment device with a panel 904 inside a frame 902. The panel 904 may have a first magnet 908 at one end and a second magnet 918 at the opposite end. The frame 902 may include a first mechanically switched magnet 906 on one side and a second mechanically switched magnet 916 on the opposite side. The first mechanically switched magnet 906 and the second mechanically switched magnet 916 may be alternated, such as switching one on while switching the other off. For example, in FIG. 9A, the first mechanically switched magnet 906 may be switched off and the second mechanically switched magnet 916 may be switched on such that the panel 904 is drawn to the bottom of the frame 902. Alternately, as shown in FIG. 9B, the first mechanically switched magnet 906 may be switched on and the second mechanically switched magnet 916 may be switched off such that the panel 904 is drawn to the top of the frame 902.

Further embodiments may include different numbers of magnets, such as multiple magnets on either end of the panel 904 or frame 902. Alternate embodiments may include only one mechanically switched magnet and rely on another force (e.g., gravity, a spring, etc.) to move the panel 904 away from the magnet.

Roller

Roller banner advertisements translate a long flexible web of film or similar material by rolling part of the film up onto a take up roller. It may be desirable to have the smart glass panels roll up like a contemporary shade, allowing maximum radiation transmission.

Alternatively, rigid panes of patterned retarder assembly can be translated the throw distance required by rolling flexible lead ends of a film up or down. Either assembly can be produced to fit existing head rail sizes. They could also make use of existing roller shade assemblies.

FIG. 10A illustrates an embodiment device with a first panel 1002 attached to a flexible film 1006. The flexible film 1006 may be rolled about rollers 1008 and 1010. The rollers 1008 and 1010 may be rotated in the same direction, as shown in FIG. 10B, such that the film 1006 shifts by wrapping around one roller and unwrapping from the other.

The first panel 1002 may shift with the film 1006 and thereby translate relative to a second panel 1004.

4 Bar Linkage

Various embodiments may include devices with a four bar linkage joint for translating one or more panels. A four bar linkage is a kinematic mechanism that allows a linear or rotational input to have a non-linear output. The output function generated behaves according to Freudenstein's equation. This allows sine and cosine function output that could be used to produce a more linearizing visual effect. Like the scotch yoke, this device can be used to create finer control at terminal positions or to counter the effects of *Malus*'s law.

Hydraulic/Pneumatic

Various embodiments may include devices for translating panels of multiple windows at once. Window curtain walls, comprising several adjacent windows, are popular in architecture. In various embodiments, it might be useful to control several windows from a single actuation source. One way to achieve this is with a mechanical linkage that distributes a single translating force to several windows. Another way to achieve this is with a pneumatic or hydraulic system that distributes force to several windows, which can be of different displacements or force.

Latching

Translation can be controlled to snap in place at one or several locations rather than sliding smoothly between all positions. This allows the user to easily set a predetermined filter level, or lock filtering in at a maximum or minimum. Such a latching system can be achieved with a mechanical detent or spring loaded metastable mechanism. This can also be achieved with a magnetic latch. Either system could be deployed at several positions along the displacement allowing multiple levels to be preset.

Section 3: Automated Translation Devices

Any of the above methods of actuation can be combined with an electromechanical system to produce an automated filtering window. These electronically controlled windows can be actuated at the flip of a traditional light switch or otherwise controlled (as indicated below in the Input section). There are several electromechanical actuators that can be used in different applications each with their own strength to weight ratio, efficiency, noise level, and actuation speed characteristics.

Motors

Electric motors can be used to generate rotational motion. This can be used in combination with any rotational input mechanical drive, including those mentioned above to produce translation. They can also be used in the same way they are used in remote controlled blinds to drive a tilt-rod. Stepper motors, brushed and brushless motor, printed armature, universal motors, and AC motors can be used along with other types. Position can be controlled with fixed mechanical stops or with the use of linear or rotational encoders.

Servos

Servomechanisms can be used in a similar fashion to a motor. Servos allow for negative positional and/or speed feedback. This can help ensure accurate position and/or allow the actuator to move quickly to the position that is desired, and then slow down to accurately and quietly approach or hold the exact required position. A servo can be mechanically tied to any linkage that takes rotational input, including those that were mentioned above. For instance a servo can drive a rotating cam.

Solenoids

Solenoids create a direct linear pulling or pushing force. A solenoid or system of solenoids may be employed to produce a force that can displace a pane 1a given distance. In the simplest system, a system of solenoids can create a bi-positional smart window. On and off states are possible. The window can be returned to start position either with the use of a return spring or with an opposing set of solenoids (or with gravity).

One drawback to traditional solenoids is that they require constant power to supply holding force for each position. Using a modified solenoid design called a latching solenoid would allow for a smart window that would only require power when switching. The advantage is to keep the solenoid from overheating while also reducing the total power used. A latching solenoid may make use of a permanent magnet to hold the displaced position.

Solenoids typically only hold 2 positions. The extended position is the default, while the retracted position is the result of applying current. By using a return mechanism, such as a spring or gravity, and applying a pulse width modulated signal (PWM), a solenoid could be created that held multiple positions. This PWM solenoid would be able to adjust displacement position and also speed. One example of the utility of this would even apply itself to a bi-stable device. Solenoids pull at high speeds and can create an impact when the pulled panel hits home. Using a varied PWM signal, a solenoid can slowly step its position back until it rests in the home position, or even increase or decrease the travel speed as it approaches its destination.

Nested solenoids may be used to extend the range of travel that the solenoid system produces. Solenoids can be arranged in series such that the maximum contraction of each is stacked to create an additive maximum. This allows for multiple positions as well.

As mentioned above, solenoids can snap into position very quickly. In some cases the impact generated from this sudden motion may be undesirable. In these cases a shock absorbing spring, pad or combination may be employed. Further a dashpot and spring device similar to a door closer can be used to slow the contraction. Finally an eddy current dashpot may be used to conserve space.

Linear Actuators

Linear motors and power screw style linear actuators may be used to directly create linear actuation. They may be used with any of the above mentioned translational inputs. They may also be directly connected to a translating panel.

Linear motors are advantageous in that they can be scaled or stacked easily to create various amounts of strength.

Shape Memory Alloy

Nickel-Titanium alloy (nitinol) can be used as a shape memory alloy (SMA). This material is typically wound into a wire which can be strained to extend its length. Under heat or a heat from a current, this material can restore its original dimensions at up to 5% strain. The benefit of this technology is that it is quiet, small, lightweight, and cuttable. Various smart glass films can be cut to length. A frame can be designed such that it is also easily scaled. Nitinol wire is capable of being cut or doubled over to produce the desired displacement or force needed. Using these SMA wires in combination with a pulley system, or other mechanical advantage mechanism, can allow an exchange of displacement distance for pulling strength. It is also possible to use a PWM scheme to achieve multipositional control. Further, since the wires are activated at certain temperatures, it is also possible to make the device heat activated.

Figure 11:
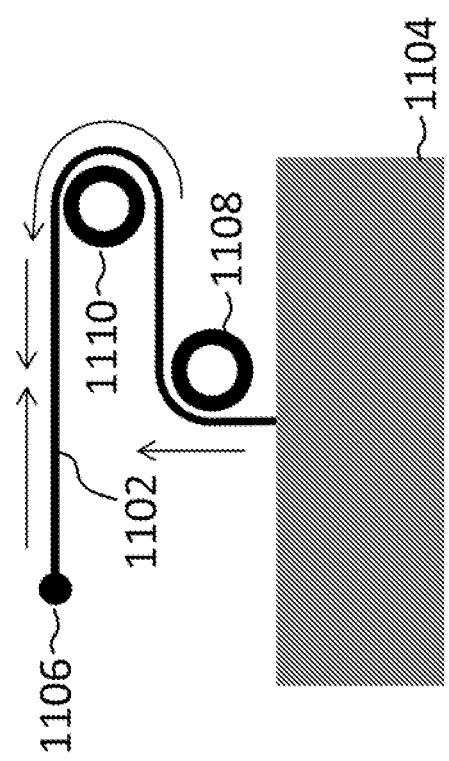
FIG. 11 is a diagram of an embodiment device with an SMA wire.

FIG. 11 illustrates an embodiment device with an SMA. A panel 1104 may be supported by an SMA wire 1102. The wire 1102 may be secured at the other end 1106, such as to a source of heat or current, and may wrap around one or more pulleys 1110 and 1108. When the SMA wire 1102 is activated (e.g., by being electrically or thermally heated), the wire may constrict and pull the panel 1104 into position.

Electro-Active Polymers (EAP)

EAPs are an emerging technology that changes shape in response to an electrical signal. Electroactive polymers contract when a current is applied. One benefit is that these actuators are easily cut or scaled to size. The strain can be controlled with the use of a PWM signal to give precise position control.

Manual Clutch

Various embodiments may incorporate a clutch that is able to physically disengage any of the electromechanical or otherwise automated systems in order that it can reengage either another electromechanical, automated or manual linkage. This would allow for a system to be automated but also to be operated in the event of a power failure.

This clutch may operate without physically disengaging with the automated or electromechanical system. Instead the electromechanical device or linkage may be designed so that it can shift linearly while still connected to the device without actuating. For example, in the case of a pneumatic system, this could be extra length in the pneumatic cables that allows the slave assembly and translating pane to be translated while remaining engaged.

Modular Electromechanical Device

Further, each electromechanical or automated device could be designed to be modularly removable. In this design scheme, removing the device would expose the translational or rotational input device allowing manual control.

Piezoelectric

Piezoelectric actuators or linear motors can be used to create high precision linear translation.

Section 4: Electrical Power Schemes

Automated translation devices may require that electrical power be provided to the window. There are several ways to accomplish this.

Direct AC wiring

Power can be supplied to the mechanical smart glass window through directly wiring the electromechanical element to an alternating current (AC) source. This power source can be obtained from wiring to the wall or to an outlet.

Batteries

Batteries can be used to power the electromechanical or electronic elements. These batteries may be replaceable or rechargeable.

Photovoltaic

The electromechanical or electronic elements can be powered using photovoltaic (PV) cells. These cells can be used on the interior or exterior faces or both. They can be in direct conductive contact with the electronics or transmit their power wirelessly.

Solar-charged batteries can be used in combination with photovoltaics to store the energy harvested. Also, capacitors and super-capacitors can be used to store a charge. This allows the windows to be operated while the photonic energy source is not present.

Inductive Coupling

Electrical power can be passed through the sealed pane of an IGU through the use of a direct induction couple or a resonant magnetic induction couple. The benefit of this technique is that power from an outlet source, wall, battery, or any other power source can be transmitted directly through the glass, allowing the IGU to remain sealed.

Microwave Power Transmission

Electrical power can be transmitted wirelessly through a number of means. Generally, any method of wireless energy transfer may be used to supply power to the smart window without the need for direct wiring. This would make installation easier. This would especially be beneficial with sealed IGU smart glass windows.

Polarizing PV glass

There are semi-transparent photovoltaic (PV) films that function by absorbing a single given polarization of radiation. This makes them act both like a PV cell and like a polarizer. This technology can be used to replace one or both of the polarizing films needed in the fabrication of polarization based variable transmission windows. This would allow for an electromechanically powered device to produce its own energy source. This energy can also be harvested and stored in any energy storage device such as a battery or capacitor. This energy can also be passed outside of the device and used elsewhere.

There are also coatable, transparent, PV cell technologies. These PV cells do not polarize radiation but may be used in combination with a mechanically filterable window or with any other kind of smart glass to produce an energy source for the glass while allowing visible light through.

Pythagoras

An existing system for extracting solar energy through a window while allowing light to pass through is the Pythagoras photovoltaic window. This system can be combined with smart glass panels to produce a filterable window that generates power. The Pythagoras system introduces small horizontal lines into the window. In some embodiments, these can be combined with certain domains of the variable radiation transmission devices by overlapping them so that only one set of lines shows. The power generated can then be used to power the linear translation of the variable radiation transmission device. Further, smart glass may be made with reflective polarizers. If these types of polarizers are used in combination with the Pythagoras system, they can be used to effectively double the amount of light directed into the solar cells when the variable radiation transmission window is in the dark state (i.e., at or around 0% radiation transmission).

Peltier/Thermocouple

Thermocouples and Peltier devices make use of the thermoelectric effect to create power from a temperature gradient. This device can be used at the interface of an indoor-outdoor curtain wall or envelope window to generate power for actuating a mechanical or traditional smart glass window.

Section 5: Inputs

With electronically actuated components, it is possible to conceive of several different electronic control schemes and devices.

Traditional Style Switches

The traditional light switch, dimmer knob, or dimmer switches may all be used to signal a change in filter level. These devices can be hooked up directly to the variable transmission window or may transmit a wireless signal.

Further, there are wireless battery free controller switches that can be styled to look like traditional light switches. These controllers use friction, radiation, and motion to gather energy used in transmitting wireless signals. These controllers could be used to make a completely maintenance free power and control scheme when used in combination with solar charged PV power solutions for the window.

IR and RF Remote Controls

Infrared (IR) and radio frequency (RF) remote control systems can be used to remotely control window transmission states. An RF or IR receiver would be placed in the electronics of the variable transmission windows. Further, the RF receiver could be a Bluetooth device to allow for Bluetooth connectivity.

Thermostat

There are energy efficiency gains to be had through interoperability with thermostats. The device itself could contain a thermostat so that when temperatures approach a given range, solar heat gain can be cut to reduce temperature gains passively. Alternatively the device can communicate with external thermostats in a wired or wireless configuration.

Smart Home Integration

Existing smart home device control and communication standards can be employed to control mechanically switchable smart glass with electromechanical controls. These can be the use of smart home devices or control devices, such as the ones provided by Johnson Controls. They can also be provided by various wireless communication standards, such as those provided by Zigbee. A smart home integrated smart glass could automatically dim in a theater room when a projector is turned on or let radiation in when a house needs heating.

Utility Integration

Higher energy savings can be realized when the control of the window is automatic. In certain smart thermostats, energy utilities can signal that shifting the temperature by a few degrees will avoid a peak load demand or save energy. A similar kind of utility supplier remote control is possible. The utility would be able to adjust the solar heat gain coefficient of a home to reduce load on an air conditioner or heater. Further, there are 3rd party utility usage monitoring sites. These websites could also directly control the transmission of the glass.

Position Feedback

It is possible to integrate existing position feedback schemes with all electromechanical control systems. Position can be measured with dead reckoning and quadrature shaft and linear encoders. It can also be measured with Hall Effect sensors to read the position of magnets that are placed on the translating or rotating portions of the device. This allows precise filter level control.

Photo Sensor

Further, it is possible to measure the direct radiation transmission with the use of a pair of photodiodes or photoresistors. One photosensor measures the ambient radiation on the external side of the window. The other sensor measures the radiation transmitted through the panel. This allows a comparison between the two values so that transmission coefficient can be directly reported in real-time.

Section 6: Thermal Actuation

It is possible to passively actuate a mechanical smart glass window without manual input. There are several methods of producing mechanical work from thermal changes. The use of these devices would effectively create a thermochromic window.

Bimetallic Strip

A thermomechanical device makes use of the differential in coefficients of thermal expansion between dissimilar metals or other materials. This is commonly known as a bimetallic strip. It can be rolled into a coil to conserve space. When heated, this strip may curl or uncurl. This action can be amplified through any mechanical advantage device (such as gearing) to produce a rotation that can interface with any of the above mentioned rotational input manual translation devices.

Liquid Column

Many fluids are known for their dramatic coefficients of thermal expansion. Mercury, ethanol, and ammonia are among the highest. When captured in a hydraulic system, they can be used to create a linear translating force that is dependent on temperature.

Piston

Gasses can be used in the same way that liquids can to create a linearly translating force that varies with temperature.

Solid Column

Solids with a high coefficient of thermal expansion can be used to create small translations that would trigger the change in filter level. A brass column could support the translating panel of the window. When temperature change induced a strain in the material, it would translate the panel and create the filtering effect.

Section 7: Frame Configuration

Shutters

Traditional shutters are solid stable frames that cover either the interior or exterior of a window. They can be added aftermarket and can control radiation with louvers, solid panels, filtered glass, or any other radiation control device. They are advantageous in that they can be opened, exposing the raw window and allowing maximal radiation transmittance. Mechanical smart glass and traditional smart glass (suspended particle devices and electrochromics) can be mounted in a shutter pane configuration. This allows for a window that has a much higher total contrast ratio (when the open shutter state is considered). They are ideally suited to manually controllable smart glass since they are almost always manually opened or closed. External shutters can provide maximal solar energy efficiency, by blocking radiation outside of the insulating IGU.

Drop in Frames

A useful embodiment of a finished mechanically filterable smart glass window is to produce a window controlling device that can be dropped in between the glass panes of a traditional insulated glass unit (IGU). The purpose of this embodiment is that it allows smart glass capabilities to be added to existing lines of windows without requiring retooling. These shading devices can also be added to existing windows simply by opening the IGU and dropping in this device. The device could simply consist of a frame that was capable of holding the mechanically filtering glass (e.g., having one or more polarizers or wave retarders) and a mechanism for moving the glass. That translation mechanism can be passed through the glass surface of the IGU with a magnetic device. Alternatively, low profile electromechanical devices can be used to create motion inside of the IGU. Solenoids, small motors, servos, and nitinol are good candidates for creating this motion. Electrical signals and power can be passed through the glass panes of the IGU with a wireless power scheme, such as an inductive couple. Proximity switches, such as touch sensors can be used to act as a local switch that can pass through the glass.

New Construction Configurations

In a new construction window, it is possible to build the frame that holds the mechanically switchable panes into the frame of the window. Further, it is possible to pass wired electrical power through a channel in the frame of the window.

Aftermarkets Attachment

It is possible to install mechanical smart glass in existing windows. The use of an added second (or third) pane of glass is common in existing in-between-the-glass blinds. Mechanical smart glass can be added in a similar fashion. The device can be attached in a similar fashion to contemporary aftermarket in-between-the-glass blinds with screws.

Alternatively, it can be made simpler and less permanent with the use of a magnetic adhesion system. It can also make use of permanent adhesive. It can also make use of "cling vinyl." It can also make use of expanding clamps that hold it into the frame of the window, rather than the pane. It can also make use of suction cups or suction cup tape.

Figure 12B:
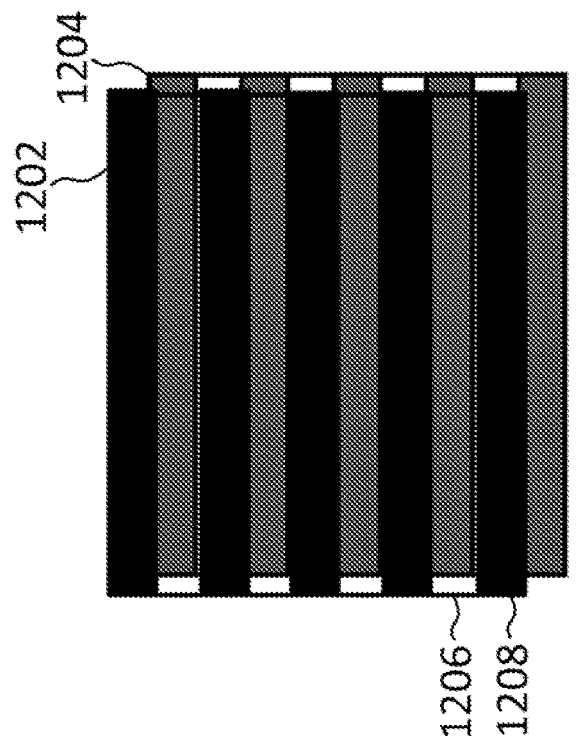
FIGS. 12A and 12B are diagrams of smart glass panels with opaque stripes.
Figure 12A:
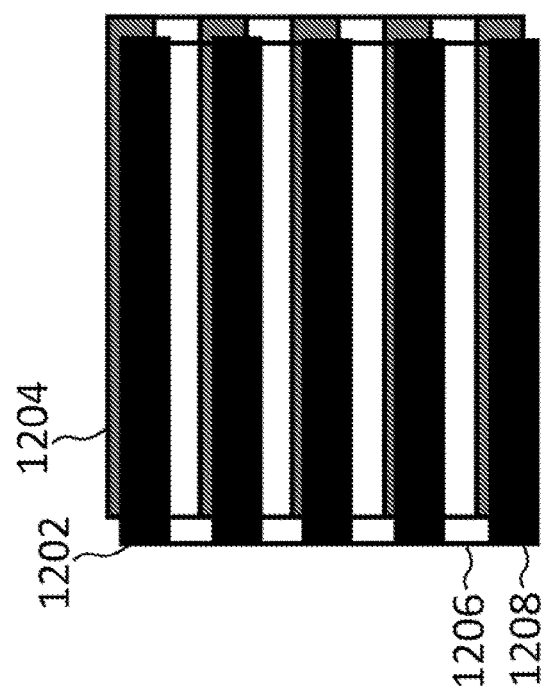

As discussed above, smart glass panels may include one or more polarizers and wave retarders. In further embodiments, mechanically controlled smart glass panels can be created with the use of opaque, tinted, or otherwise varied domains of ink or other radiation blocking material. For example, as shown in FIGS. 12A and 12B, an embodiment of the invention can be created using two sheets of glass or transparent plastic 1202 and 1204 with alternating clear stripes 1206 and opaque stripes 1208 on each sheet. The striped sheets may be configured such that one of the sheets may be translated relative to the other thereby changing the alignment of the stripes. FIG. 12B shows a first sheet 1202 translated such that the first sheet's opaque stripes 1208 cover the clear stripes 1206 of the second sheet 1204. Varying alignment of the stripes may allow radiation transmission to vary. For example, if the alternating clear and opaque stripes are the same thickness on both sheets, radiation transmission may vary between 0% and 50%.

The larger these domains or stripes are, the more visual interruption there is. If the stripes were sufficiently small, they would visually blur together and produce a more even looking viewing surface. For example, stripes or domains may be 0.2-2 mm thick. However, when the stripes are made sufficiently small, they become increasingly more difficult to accurately position and protect against racking.

The following embodiment devices and methods help to overcome this dimensional accuracy issue and are illustrated in FIGS. 13A and 13B. If the clear stripes 1308 and opaque stripes 1306 of the first panel 1302 and second panel 1308 are canted at a small angle 1314, and the translation is along the long direction 1312 of the stripes, then the panel can be translated a further distance 1316, and therefore with higher accuracy, while maintaining a small stripe width. For example, the stripes or domains may extend lengthwise in a direction 1310 which may be canted (i.e., tilted or slanted) with respect to the direction of translation 1312 by an angle 1314 less than 45 degrees, such as 7-10 degrees. The translation direction 1312 may be any direction, such as vertical as shown in FIGS. 13A and 13B or horizontal. Accordingly, the domain lengthwise direction 1310 may differ by a cant angle 1314 (e.g., 7-10 degrees in either direction) from vertical or horizontal. The throw distance 1316 (i.e. translation distance of one sheet or panel relative to another) may be 0.5-2 inches. FIGS. 13A and 13B illustrate an embodiment with canted stripes and a resulting throw distance greater than stripe thickness.

In various embodiments, the domains or stripes may be the same or different size (e.g., width and length) as other stripes or domains on the same or other sheet. For example, alternating clear and opaque stripes may be the same thickness on both sheets as shown in the figures. Alternately, in another example, the clear stripes may be larger than the opaque stripes on both sheets. In this example, the sheets may be configured such that radiation is never fully blocked even after translating any throw distance. If the difference between opaque and transparent domains' total area are non-zero, then the window can be biased to achieve various transmission ranges. For example, a window where the transparent stripes were 4 times the size of the opaque stripes would produce a window whose transmission range was between 20% and 40%.

In further embodiments, the domains or stripes may have varying degrees of opacity or translucence. For example, the sheets may have alternating domains that are partially opaque and fully opaque or regions that are partially opaque and slightly more opaque.

Another benefit of using these printed stripes is that they can be made of a variety of materials. For example a blue ink or white ink would create windows that tint to an opaque blue or white respectively. A reflective or metallic ink can create a smart mirror that changes reflectivity with displacement. Stripes of infrared blocking material will allow for a window that selectively transmits or denies radiative heat without changing visible transmission strongly (e.g., if stripes are transmissive to visible light). Further any combination of these techniques can be used. For example one color stripes on one sheet may be hidden behind stripes of a second color on the other sheet, producing a window that achieves a first color and then a second color upon translation (e.g., a partially opaque blue strip and partially opaque yellow strip producing green when translated behind each other). Also a window that is one color on one side (in the opaque state) and a second on the other (in the opaque state) is possible.

In further embodiments, the devices described above maybe used in combination with domains of alternatingly oriented polarizers. For example, these polarizer domains may be organized into strips with horizontally or vertically oriented polarization axes (i.e., the strips may all be oriented in a first direction, but each strip may have a separate orientation of its polarization axis, such as strips of alternating polarization axis orientation). Further, these strips may be at an angle to the direction of translation. This canting would make a window that appears to go through shades of gray when the lines were small enough and far enough away.

Further embodiments include devices and methods for producing a window that can be switched between heat blocking and heat transmissive states. A significant proportion of the solar heat gain allowed by traditional windows is admitted through the infrared spectrum of light. In order to cut down on this, infrared filtering panels such as heat mirror, low-emissivity (Low-e) and others are applied to permanently block this transmission, while leaving visible light largely unaffected. One down side to this is that there are situations in which the energy from solar heat gain is desirable. On cool days, or winter months, the denied solar heat gain would have reduced the energy load on heating equipment. A window that can be switched between heat blocking and heat transmission would allow the user to select this quality when desired.

A mechanically selectable heat mirror can be constructed in the same manner as a mechanically selectable visible transmission window. A switchable heat mirror can be made from materials that are relatively transparent in the visible spectrum but reflective in the infrared (IR). These existing materials are arranged in a plurality of regions with gaps of infrared transmitting regions between them.

Figure 14:
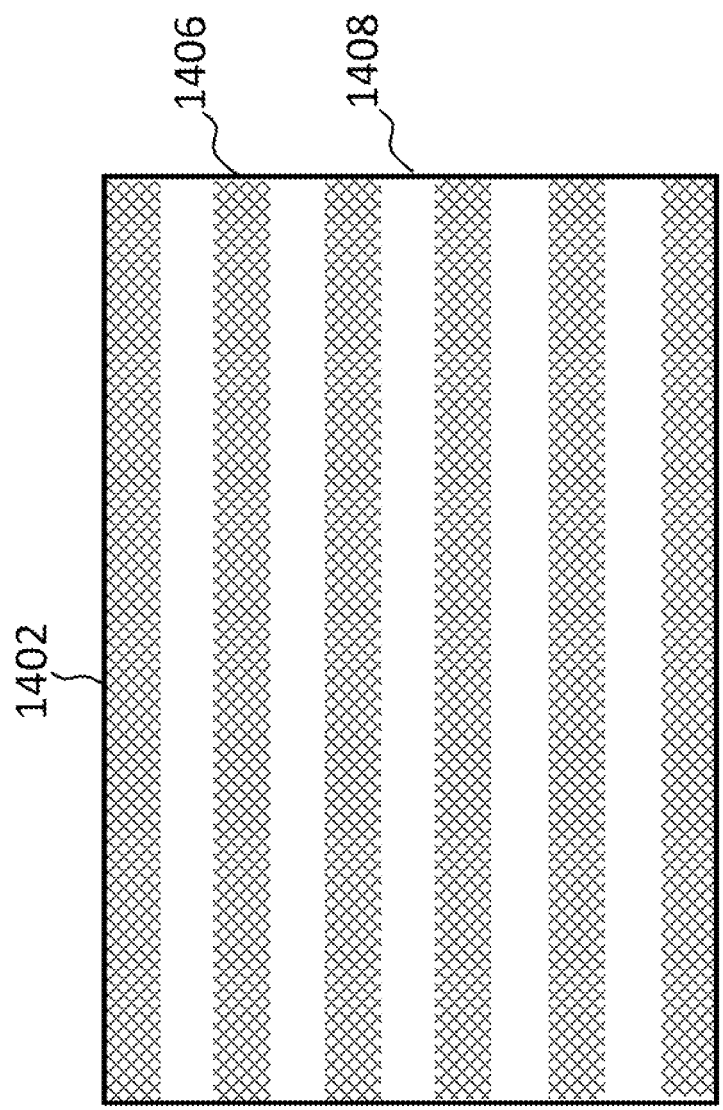
FIG. 14 is a diagram of smart glass panel with heat reflective and heat transmissive portions.

FIG. 14 illustrates a panel 1402 with heat mirror stripes 1406 and heat transmissive stripes 1408. When two of these sheets are fabricated and aligned in parallel, the net effect will be a window that transmits a theoretical maximum of 50% on the radiative heat energy from the IR spectrum. When one sheet is displaced the distance of the height of one of the regions, the two sheets will be offset by one region. This will result in a window with a theoretical minimum of 0% radiative heat energy transmission from the IR spectrum.

FIGS. 15A and 15B illustrate the effect of translation. In FIG. 15A, a first panel 1502 and a second panel 1504, each including heat mirror stripes 1406 and heat transmissive stripes 1408, are aligned such that only 50% of infrared radiation 1510 passes through the device. In FIG. 15B, the second panel 1504 is shifted to align the heat mirror stripes 1406 with the heat transmissive stripes 1408 of the first panel 1502 such that no infrared radiation 1510 passes through the device.

In further embodiments, the infrared radiation transmitted can vary between any other percentages depending on the degree of stripe overlap and the ratio of the widths of the heat mirror stripes to the heat transmissive stripes.

In various embodiments, the panels with opaque, tinted, or otherwise varied domains of ink or other radiation or heat blocking material as discussed above with regard to FIGS. 12-15 may be coupled with any one or more of the mechanical devices described herein to form variable radiation transmission devices that may be mechanically actuated to control radiation transmission.

The advantage of this technology would be to create a window that can selectively allow or deny the passage of infrared radiation. In winter months, or situations in which more solar heat gain is desirable, it is possible to allow this in. In summer months, or situations in which less solar heat gain is desirable, it is possible to block this IR radiation.

This technology can be applied to previous descriptions of mechanically switchable smart glass and make use of the same mechanisms. This creates a window that switches on or off for visible and infrared sources of radiation together.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A variable transmission device, comprising:
a first smart window panel comprising a first patterned wave retarder;
a second smart window panel comprising a second patterned wave retarder; and
a cam slider coupled with the first wave retarder such that rotating the cam slider causes the first wave retarder to linearly translate relative to the second wave retarder.

2. The device of claim 1, wherein:
the first panel further comprises a first uniform polarizer with a first polarization axis;
the second panel further comprises a second uniform polarizer with a second polarization axis; and
the mechanical device is configured to linearly translate the first panel relative to the second panel.

3. The device of claim 1, wherein the first wave retarder is coupled with a spring configured to oppose linear translation of the first waver retarder caused by the cam slider.

4. The device of claim 1, wherein the cam slider comprises a ratcheting device.

5. A variable transmission device, comprising:
a first smart window panel comprising a first patterned wave retarder;
a second smart window panel comprising a second patterned wave retarder; and
a wedge coupled with the first wave retarder such that translating the wedge causes the first wave retarder to linearly translate relative to the second wave retarder.

6. The device of claim 5, wherein the first wave retarder is coupled with a spring configured to oppose linear translation of the first waver retarder caused by the wedge.

7. A variable transmission device, comprising:
a first smart window panel comprising a first patterned wave retarder;
a second smart window panel comprising a second patterned wave retarder; and
a mechanical device configured to linearly translate the first wave retarder relative to the second wave retarder,
wherein the mechanical device comprises at least one of a rack and pinion device, a pulley, an over-center linkage, a lever, a worm gear, a scotch yoke, a roller, or a four bar linkage;
wherein the mechanical device is configured to be electrically controlled by at least one of a motor, servomechanism, solenoid, shape memory alloy, or piezoelectric device.

8. The device of claim 7, further comprising a latching mechanism.

9. The device of claim 7, further comprising a photovoltaic or thermoelectric device.

10. The device of claim 7, wherein the mechanical device is configured to be actuated based on an ambient temperature or electrical feedback.

11. A variable transmission device, comprising:
a first smart window panel comprising a plurality of alternating domains varying in transmission of radiation;
a second smart window panel comprising a plurality of alternating domains varying in transmission of radiation; and
a mechanical device configured to linearly translate at least a portion of the first panel relative to the second panel,
wherein the first and second panel both comprise at least one first domain that is opaque or partially opaque and at least one second domain that is less opaque than the first domain;
wherein the domains are stripes longitudinally oriented in a first direction; and the first or second panel is configured for linear translation in a second direction at an acute angle relative to the first direction.

12. The device of claim 11, wherein the first and second panel comprise alternating opaque and clear domains.

13. A variable transmission device, comprising:
a first smart window panel comprising a plurality of alternating domains varying in transmission of radiation;
a second smart window panel comprising a plurality of alternating domains varying in transmission of radiation; and
a mechanical device configured to linearly translate at least a portion of the first panel relative to the second panel, wherein the first and second panel both comprise at least one first domain that is opaque or partially opaque and at least one second domain that is less opaque than the first domain, wherein all of the domains of the first and second panel are stripes with the same thickness.

14. A variable transmission device, comprising:

a first smart window panel comprising a plurality of alternating domains varying in transmission of radiation;

a second smart window panel comprising a plurality of alternating domains varying in transmission of radiation; and a mechanical device configured to linearly translate at least a portion of the first panel relative to the second panel, wherein the first and second panel both comprise at least one first domain that is opaque or partially opaque and at least one second domain that is less opaque than the first domain, wherein the first panel and the second panel comprise alternating strips of varied angles of polarization.

15. A variable radiation transmission device, comprising:

a first panel comprising a plurality of alternating domains varying in transmission of radiation; and a second panel comprising a plurality of alternating domains varying in transmission of radiation, wherein the first or second panel is configured to be linearly translatable relative to the other one of the first or second panel, and wherein the first and second panel both comprise at least one first domain that is opaque or partially opaque and at least one second domain that is less opaque than the first domain;

a mechanical device configured to linearly translate the first panel relative to the second panel, wherein the mechanical device is configured to be actuated by at least one of a magnetic, hydraulic, or pneumatic device.

* * * * *